United States Patent [19]

Marcinek

[11] Patent Number: 4,521,369
[45] Date of Patent: Jun. 4, 1985

[54] METHOD OF MAKING MOLECULARLY ORIENTED PLASTIC BOTTLES

[75] Inventor: John A. Marcinek, Westfield, Mass.

[73] Assignee: Emhart Industries, Inc., Farmington, Conn.

[21] Appl. No.: 567,517

[22] Filed: Jan. 3, 1984

Related U.S. Application Data

[60] Division of Ser. No. 56,426, Jul. 10, 1979, Pat. No. 4,432,530, which is a continuation-in-part of Ser. No. 863,746, Dec. 23, 1977, abandoned.

[51] Int. Cl.³ .............................................. B29C 17/07
[52] U.S. Cl. ...................................... 264/532; 264/537
[58] Field of Search ............... 264/532, 537, 538, 523, 264/535; 425/528, 533, 542, 577, 468; 249/63, 142, 175

[56] References Cited

U.S. PATENT DOCUMENTS

| | | | |
|---|---|---|---|
| 2,715,751 | 8/1955 | Weber | 425/533 X |
| 2,789,312 | 4/1957 | Borer | 425/533 X |
| 3,191,225 | 6/1965 | Polka | 425/533 X |
| 3,543,340 | 12/1970 | Guelph | 425/533 X |
| 3,635,635 | 1/1972 | Moslo | 425/533 X |
| 3,663,143 | 5/1972 | Fischer | 425/533 X |
| 3,986,806 | 10/1976 | Bryerlein et al. | 425/533 X |

*Primary Examiner*—Jan Silbaugh
*Attorney, Agent, or Firm*—A. W. Breiner

[57] ABSTRACT

Mold and core rod combination for forming a plastic parison for stretch/blowing into a plastic bottle comprising a core rod with an end mated to the mold so as to permit formation of a parison with a flat on the bottom and having a sharp taper from said flat to the sidewall of the parison. The core rod is preferably shaped to include a shoulder having a substantially straight outer wall at the mouth end of the parison mold, and constructed and arranged with the mold to permit deposit of additional plastic at the inner wall of the shoulder of the parison. The design of the mated mold and core rod combination is based on the recognition that in a continuous bottle forming process a particular area of the parison can be made hotter or cooler by increasing or decreasing the thickness of that area of the parison. Parisons formed with the disclosed mold-core rod combination permit a deeper and longer stretch of the parison without tearing or deformation of the parison bottom or deformation or wrinkling at the shoulder of the finished bottle while providing essential wall strength.

6 Claims, 8 Drawing Figures

METHOD OF MAKING MOLECULARLY ORIENTED PLASTIC BOTTLES

This application is a divisional of copending application Ser. No. 056,426 filed July 10, 1979, now U.S. Pat. No. 4,432,530 issued Feb. 21, 1984; which in turn is a continuation-in-part of application Ser. No. 863,746 filed Dec. 23, 1977, now abandoned.

FIELD OF INVENTION AND BACKGROUND

This invention is directed to a method and apparatus for molding plastic bottles. More particularly, it is directed to a parison mold and core rod combination which forms a parison having a flat bottom wall with sharply tapered corners, and a shoulder having a substantially straight outer wall and additional plastic at the inner wall thereof which permits a deeper or longer stretch without having the stretch rod damage the parison bottom and/or without deformation in the shoulder of the finished bottles. The shoulder of the finished bottle is slightly thicker than the sidewall.

In recent years substantial effort has been directed to the formation of molecularly oriented plastic bottles as a replacement or partial replacement for glass bottles. According to the prior art, a plastic parison is first injection molded in a parison mold and the parison thereafter stretch/blown into the finished bottle using either of two commonly employed processes, the first being the so-called reheat or two-stage process, and the second being the so-called hot blow or one-stage process. In the reheat or two-stage process the parison, after formation in the parison mold, is removed from the parison mold, cooled to room temperature, and stored for subsequent stretch/blowing in a blow mold into the finished bottle. At the time of the stretch/blowing operation, the parison is reheated and brought to the stretch/blow temperature of the plastic by means of heaters prior to blowing. In the reheat system, if a particular section of the parison is to be at a higher heat, more heat is put into that particular area by using hotter heaters, or the like. In the hot blow or one-stage process after the parison is injection molded in a parison mold it is transferred to a blow mold substantially immediately after formation and while still retaining the heat necessary for the parison to be stretch/blown into the finished bottle. In the hot blow or one-stage process, the cooling of the parison is essentially uniform throughout the parison and, accordingly, provided the thickness of all areas of the parison is the same, all areas of the parison will be at substantially the same temperature.

Various plastics have been suggested for use in the formation of molecularly oriented plastic bottles. The plastics most commonly suggested are polyacrylonitrile or polyethylene terephthalate (PET). Basically the steps of the bottle formation are the same with all plastics. However, each individual plastic will have its own characteristics, and certain modifications—as known to one skilled in the art—are required with respect to handling including modification of temperature conditions, and the like.

As known in the art, the parison to a substantial extent controls the shape and size of the finished bottle. Accordingly, it is essential in order to obtain a bottle without deformations or other imperfections to carefully control the thickness of the parison walls and bottom in addition to controlling the neck finish. Control of the parison during formation has permitted the manufacture of high quality bottles of small and intermediate size with acceptable quality control being possible. However, it has been found in the manufacture of large size bottles, i.e., up to 64 fluid ounces, which are becoming increasingly popular, that problems are encountered including tearing and/or puncturing of the parison bottom by the stretch rod during stretching; deformation at the shoulder of the bottle, and overall poor quality control due primarily to the longer or deeper stretch operation necessary in the formation of bottles of large size.

OBJECTS OF THE INVENTION AND GENERAL DESCRIPTION

Accordingly, a primary object of the present invention is to provide a method and apparatus for formation of parisons capable of being stretch/blown into bottles, including bottles of a large size, with improved and consistent quality.

It is another object of the present invention to provide a method and apparatus for the formation of a parison capable of being stretch/blown into a bottle, including a bottle of large size, without substantial deformation or imperfections in the bottom of the bottle or in the shoulder of the bottle.

It is another object of this invention to provide a method and apparatus for the formation of a parison capable of being stretch/blown into a bottle, including a bottle of large size, wherein the shoulder is of slightly greater thickness than the sidewall.

It is another object of this invention to provide a method and apparatus for the formation of a parison capable of being stretch/blown into a bottle, including a bottle of large size, wherein the bottom of the parison includes a flat portion; there is a sharp taper from the flat portion to the sidewalls of the parison, and the sidewalls are thicker than the parison bottom.

It is another object of this invention to provide a parison mold-core rod assembly for formation of a parison having a bottom thinner than the sidewall of the parison and wherein the bottom corner of the parison is sharply tapered.

It is another object of this invention to provide a parison mold-core rod assembly for the formation of a parison to be stretch/blown into a bottle having a shoulder wherein the shoulder of the parison has a greater thickness than the sidewall of the parison.

It is another object of this invention to provide a parison wherein the bottom is thinner than the sidewall thereof, and wherein the bottom corner of the parison has a thickness less than the thickness at the sidewall of the parison.

It is another object of this invention to provide a parison for stretch/blowing into a bottle wherein the parison shoulder is thicker than the sidewall of the parison.

It is another object of this invention to provide a parison wherein the parison bottom is thinner and the parison shoulder is thicker than the parison sidewall.

These and other objects of the present invention will be apparent from the following description, particularly reference being made to the drawing.

Briefly, the aforesaid and other objects of the invention are accomplished based on the recognition that in a continuous or hot blow process a particular area of the parison can be made hotter by increasing the thickness of that area of the parison, coupled with the discovery that the bottom thickness of the parison is critical in determining the stretch characteristics of the parison. The thinner the bottom wall, the less the amount of heat contained in the bottom of the parison which permits a longer or deeper stretch of the shoulder and sidewall portions without having the stretch rod puncture, tear, or deform the bottom of the parison. Accordingly, formation of a parison with a bottom thinner than the sidewall permits the manufacture of a bottle of larger size with a relatively thinner sidewall.

It was further discovered that a deeper and longer stretch of the parison without tear or deformation is possible by providing a parison having less or an equal amount of plastic material deposited at the corner of the parison bottom than at the middle of the parison bottom. The latter is accomplished, for example, by utilizing a core rod having a flat portion at its end mated with a parison mold having a sharply tapered annular corner leading into the sidewall. The result is a parison bottom having an annular corner thickness equal to or thinner than the parison bottom at the middle of the bottom. The extra plastic in the sidewall of the parison relative to the parison bottom provides additional heat, permitting a greater stretch. The parison bottom, being cooler in relation to the sidewall, is not punctured or otherwise deformed by the stretch rod.

It was also discovered that deformation and wrinkling of the shoulder portion of the finished bottle can be prevented by increasing the amount of plastic at the shoulder. Preferably, the outer wall of the shoulder will be substantially straight, with the additional plastic being at the inner wall of the shoulder. Further, it was found that with the increased amount of plastic in the shoulder area it was possible to provide a bottle wherein the thickness of the shoulder is substantially equal to or preferably slightly greater than the sidewall. With certain types of neck finishes, and/or shoulder designs, without having the parison shoulder of a greater thickness, it was found that the shoulder of the finished bottle was thinner than the sidewall of the bottle, leading at times to deformation or wrinkling during manufacture.

Finally, it was discovered that there is a direct relationship in the thickness desired in the bottom, shoulder, and sidewall areas of the parison in order to provide uniformity in the finished bottle and to provide the essential tensile yield strength for a given bottle diameter at the bottom, shoulder, and sidewall areas. The bottom of the parison is preferably thinner in comparison to the sidewall and shoulder portions to permit a greater stretch without puncture of the bottom wall. It is also desirable in certain designs or sizes to have the shoulder area thicker in comparison to the sidewall to compensate for the flow of material in the shoulder area. The desired characteristics are provided by programming the core rod and parison mold design to obtain the desired bottom thickness relative to the sidewall portion of the parison and thereafter shaping the core rod adjacent to the mouth of the parison mold to provide the desired thickness at the shoulder area. Final adjustment is achieved by moving the core rod within the mold.

DRAWING AND DETAILED DESCRIPTION OF INVENTION

In the drawing which illustrates preferred embodiments and mode of operation of the invention, FIG. 1 is a fragmentary cross-sectional view of a split parison mold including a split neck ring finish in closed position with the core rod in place;

Figure 1:
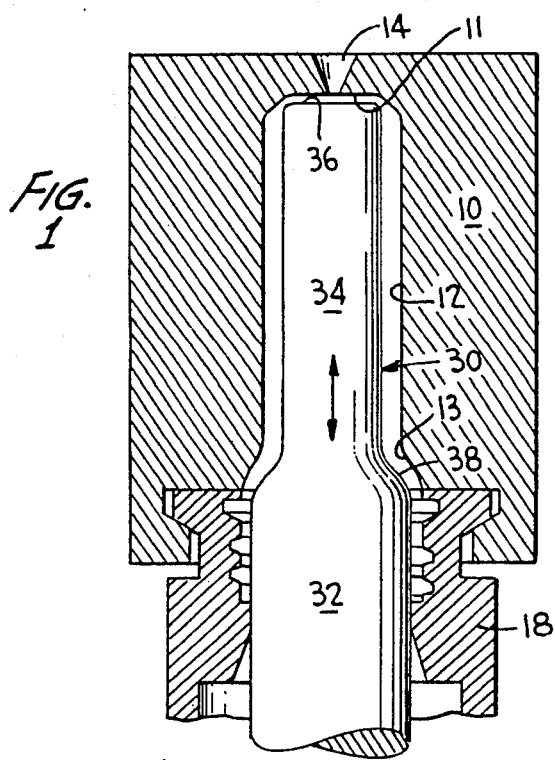
Figure 2:
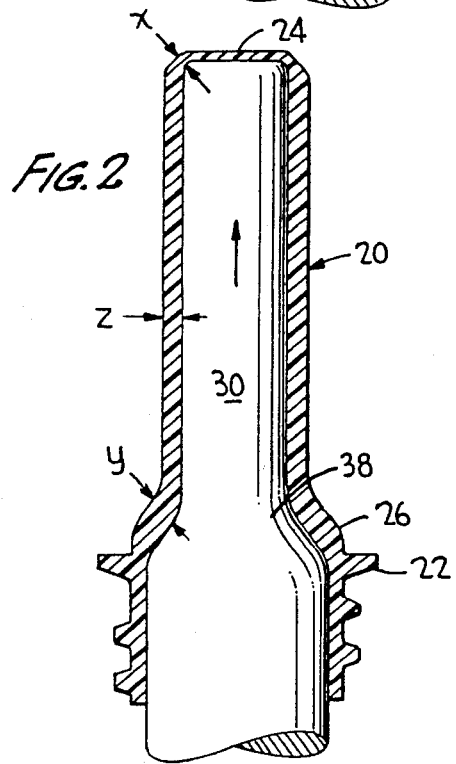
FIG. 2 is a cross-sectional view of a molded parison with a shaped core rod in place, showing the relationship between the thickness of the bottom, sidewall, and shoulder areas of the parison.

Referring primarily to FIGS. 1 and 2, there is illustrated a partable injection mold 10 having a parison cavity 12 for molding a parison in a conventional manner through gate opening 14. The illustrated mold 10 is designed for molding a tubular parison, generally identified by numeral 20, for a container which includes a threaded neck finish 22 as shown in FIG. 2 wherein the core rod remains in place. For convenience of handling the parison, the mold 10 is provided with a split neck ring 18 to provide the threaded neck finish. Cooperating with mold 10 and split neck ring 18 for the formation of the parison is a core rod generally identified by the numeral 30. The core rod includes a base portion 32 and a core rod proper 34 having a flat end 36 which in cooperation with flat mold section 11 forms the bottom 24 of the parison 20. Additionally, the core rod includes a shoulder 38 which in cooperation with curved mold section 13 forms the shoulder portion 26 of the parison. The bottom thickness of the parison is controlled by the upward or downward adjustment of the core rod. Additionally, the shape of and amount of plastic deposited at the parison shoulder 26 is controlled by machining the core rod shoulder 38. As apparent, however, movement of the core rod will affect the shoulder and bottom thickness and, accordingly, bottom thickness, sidewall thickness, and shoulder thickness must be programmed for each parison, as determined by the dimensions of the desired finished bottle, and the parison mold and core rod mated accordingly.

FIG. 2 illustrates a parison having a thin bottom, a sharply tapered bottom corner wall X, and a thick shoulder wall Y relative to sidewall Z. It has been found with certain bottle designs and bottle sizes, in accordance with the present invention, that the relative thickness of the bottom of the parison and the thickness of the shoulder to form a bottle having substantially uniform wall thickness with the essential tensile yield strength and without imperfections is at a substantially direct ratio. In other words, the thinner the bottom, the thicker the shoulder to provide a parison sidewall of intermediate thickness. As will be apparent, the thickness of the shoulder relative to the bottom and sidewall of the parison is determined by machining of the core rod to the desired shape after the thickness of the bottom and sidewall has been determined.

Figure 5:
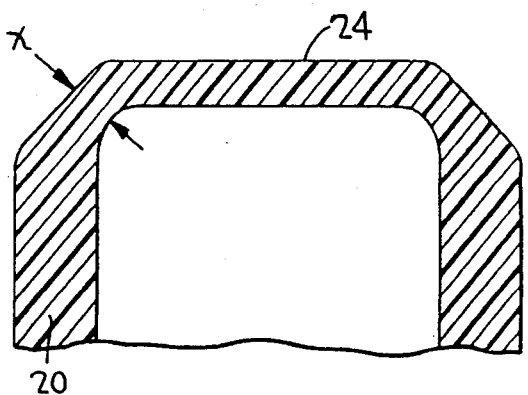
FIG. 5 is a fragmentary enlarged cross-section of the bottom of a parison made in accordance with this invention.
Figure 8:
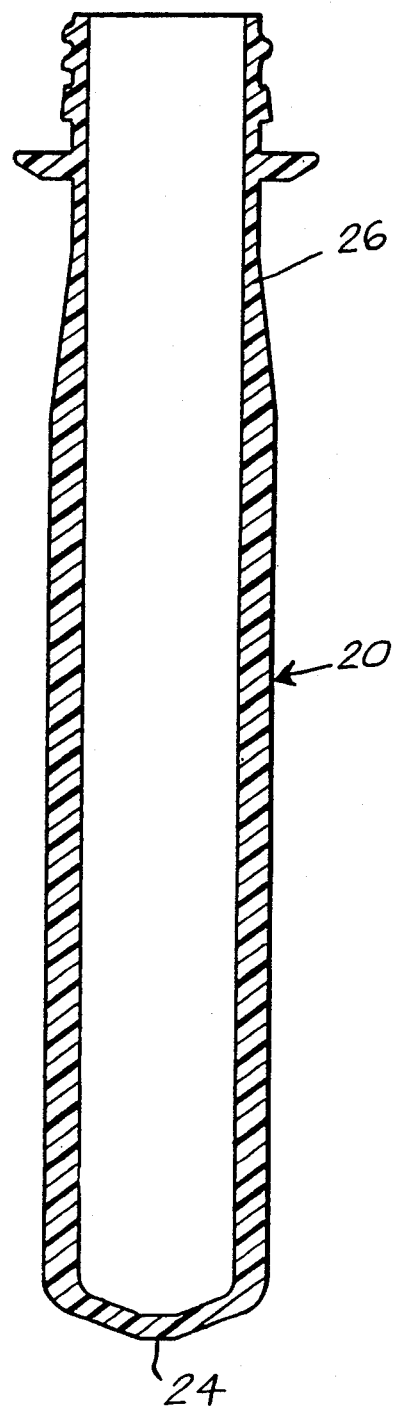
FIG. 8 is a cross-sectional view of another embodiment of a parison made in accordance with this invention.

As is further apparent, by using a mold 10 having the flat and sharply tapered cornered bottom 11 and a core rod 30 with a flat end 36, the molded parison will have a corner wherein there is a rapid transition from bottom to sidewall. The enlarged fragmentary cross-section of the bottom of the parison as shown in FIG. 5, made with a parison mold assembly shown in FIG. 1, more clearly illustrates the bottom-to-sidewall relationship. FIG. 8 is a view showing the same relationship. However, in the view of FIG. 8, the portion of the bottom wall which is flat is substantially reduced from the embodiment shown in FIG. 5. Accordingly, the taper from the flat bottom wall section to the sidewalls, while still being sharply tapered, is substantially longer. As is apparent, the bottom wall including the flat section and the tapered section, in both embodiments, has a thickness less than the thickness of the parison sidewall. Additionally, in the embodiment shown in FIG. 8 the shoulder area is not thickened with respect to the sidewall area and, in fact, is tapered to provide a thinner wall area. The internal surface of the parison, however, is linear from the top of the parison neck finish to the annular corner of the bottom of the parison. This design has advantage with respect to certain neck ring finishes and bottle sizes where the critical feature is primarily in having a substantially deep stretch. The rapid transition between the flat portion of the bottom and the sidewall is highly advantageous during a stretching operation to provide a bottle of large size, such as a 64 fluid ounce or the like bottle, since the bottom, including the annular corner, will be cooler, permitting rapid and deep stretch without puncture or deformation.

Figure 7:
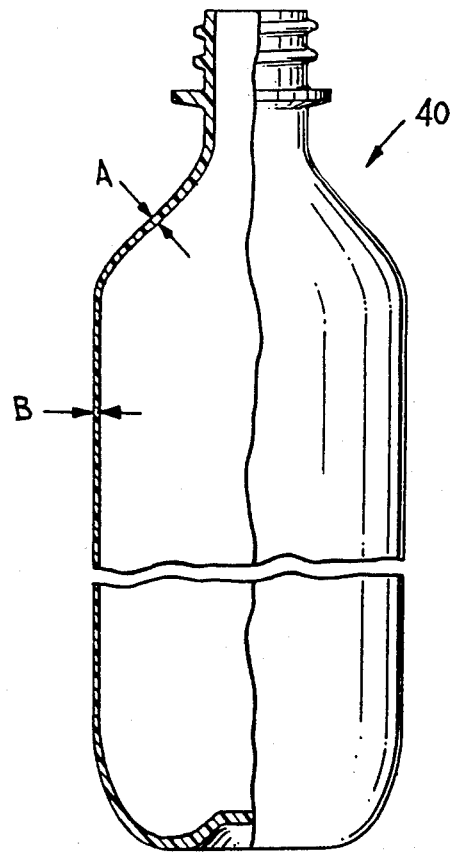
FIG. 7 is a broken-away view of a finished bottle partly in cross-section.

After the stretch/blow of a parison having the shape of the parison shown in FIG. 2, the bottle 40 will have the shape as shown in FIG. 7 wherein the wall thickness at the shoulder A is slightly greater than the sidewall thickness as shown at B, providing a bottle which will have the essential strength at the sidewall and at the shoulder areas.

Figure 6:
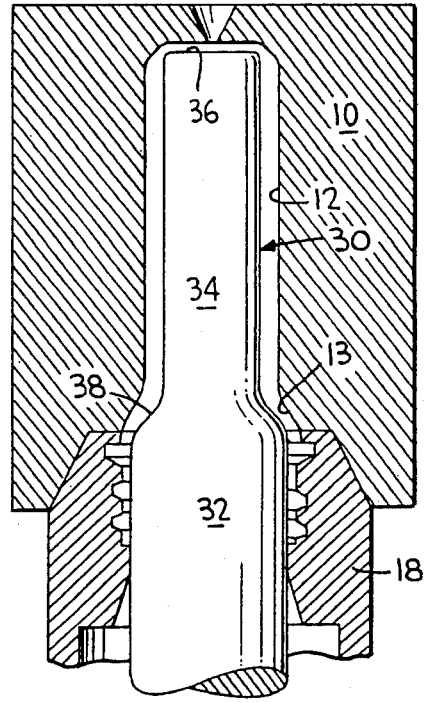
FIG. 6 is a fragmentary cross-sectional view of a solid parison mold including a split neck finish in a closed position with the core rod in place.
Figure 4:
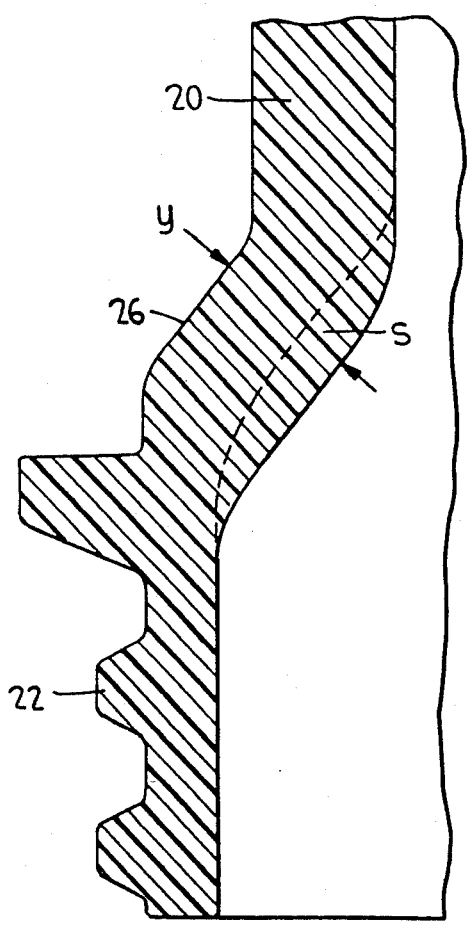
FIG. 4 is a fragmentary enlarged cross-section of the shoulder of a parison made in accordance with this invention.

FIG. 6 illustrates a parison mold-core rod assembly substantially similar to that shown in FIG. 1. However, in FIG. 6 the split or partable mold 10 has been replaced with a solid mold 10. The solid mold permits better and more uniform cooling in that there is no split in the mold. Further, the solid mold requires less clamping pressure. In order to remove the parison and core rod assembly from the solid mold without damage to the parison, the mold has a slight taper from the gate end to the neck ring end. Moreover, the split neck ring assembly 18 is modified in order that the neck ring assembly can be directly withdrawn from association with the parison mold 10 without splitting of mold 10. The slight taper in the mold is not sufficient to impart noticeable variation in the finished bottle.

Figure 3:
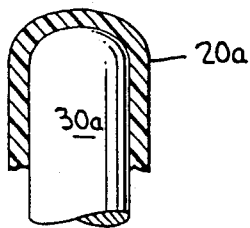
FIG. 3 is a fragmentary cross-sectional view of a conventional or prior art parison with the core rod in place.

To contrast the parisons of the present invention from the prior art, FIG. 3 is a fragmentary illustration of a conventionally employed or prior art core rod 30a having parison 20a formed thereon. As apparent, the rounding of the core rod in conjunction with the mold provides a uniform thickness to the parison sidewall and bottom. With the configuration of FIG. 3 in a deep stretch or long stretch operation to provide a large sized bottle, rupture of the bottom often occurs, the disadvantages of such occurrence being apparent.

Although the parison mold-core rod assembly can be used in the formation of parisons of any biaxially oriented plastic material, it is of particular value when working with polyethylene terephthalate (PET). It has been found that with PET it is essential to have a definite relationship between the parison diameter and the average bottle diameter particularly to obtain the essential tensile yield strength in the hoop direction. Accordingly, since it is normally not possible or desirable to control the bottle diameter to obtain a bottle of a desired volume, in most instances it is essential to control the diameter of the parison through an adjustment in the diameter of the core pin used to produce the parison for forming the bottle. Further, it has been found that PET, when stretching the parison longitudinally, requires substantial heat in the sidewall and shoulder areas relative to the bottom and, thus, requires a parison with a thin bottom relative to the shoulder and sidewall areas. Furthermore, although the present invention is primarily concerned with parisons for use in a continuous or one-step process, the parison of this invention can also be of value in the so-called reheat or two-stage process. As will be apparent to one skilled in the art, various modifications can be made within the hereinbefore described apparatus and process with respect to making improved bottles. The preferred embodiments described are not to be construed as a limitation of the invention.

It is claimed:

1. Process of manufacturing a molecularly oriented plastic bottle comprising the steps of (1) providing an injection molded plastic parison having a bottom wall portion, a sidewall portion, a shoulder portion and a neck finish, said bottom wall portion having a flat area and there being an annular corner area joining said bottom wall and sidewall portions, said bottom wall portion having a thickness less than the thickness of said sidewall portion with there being a rapid transition from said flat of said bottom wall to said sidewall portion with said sidewall thickness being substantially constant from said annular corner area to said shoulder portion; (2) positioning said parison in a stretch/blow mold; and (3) stretch/blowing said parison in said blow mold to form a finished bottle.

2. The process of claim 1 wherein the bottom wall of said parison is thinner at the annular corner thereof than at the flat portion thereof.

3. The proces of claim 1 wherein the bottom wall thickness of said parison at the annular corner and the middle thereof is equal.

4. The process of claim 2 wherein the plastic is polyethylene terephthalate.

5. Process of manufacturing a molecularly oriented plastic bottle comprising the steps of (1) providing an injection molded plastic parison having an annular shoulder and a bottom wall having a flat portion, said bottom wall having a thickness less than the thickness of the parison sidewall and there being a sharp taper from said flat portion through an annular corner thereof to said sidewall, said annular shoulder having a greater thickness than said parison sidewall; (2) positioning said parison in a stretch/blow mold; and (3) stretch/blowing said parison in said blow mold to form a finished bottle.

6. The process of claim 5 wherein there is a direct ratio between the thickness of said parison bottom, said parison shoulder, and said parison sidewall.

* * * * *